25681
Jan. 28, 1964     R. A. PANNIER     3,119,329
MARKING DEVICE FOR DIFFERENTIALLY COATED TIN PLATE
Filed Feb. 23, 1961     3 Sheets—Sheet 1
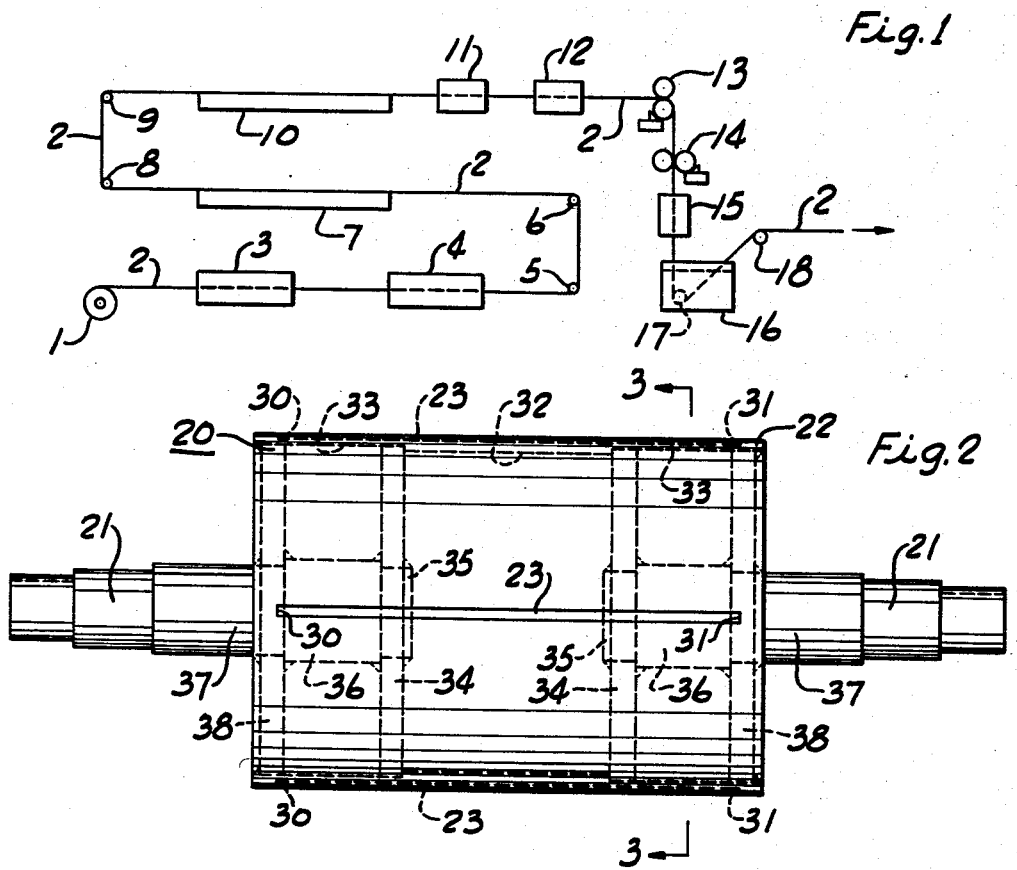
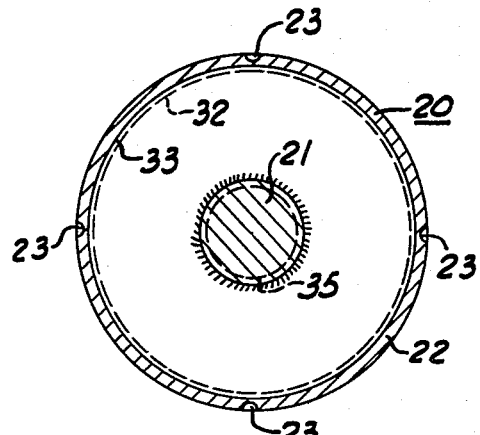
INVENTOR.
RALPH A. PANNIER
BY *William D. Carothers*
HIS ATTORNEY Jan. 28, 1964    R. A. PANNIER    3,119,329
MARKING DEVICE FOR DIFFERENTIALLY COATED TIN PLATE
Filed Feb. 23, 1961    3 Sheets-Sheet 2
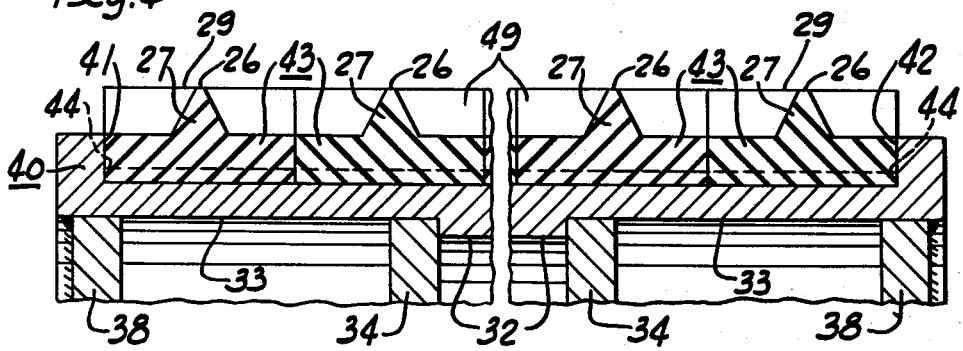
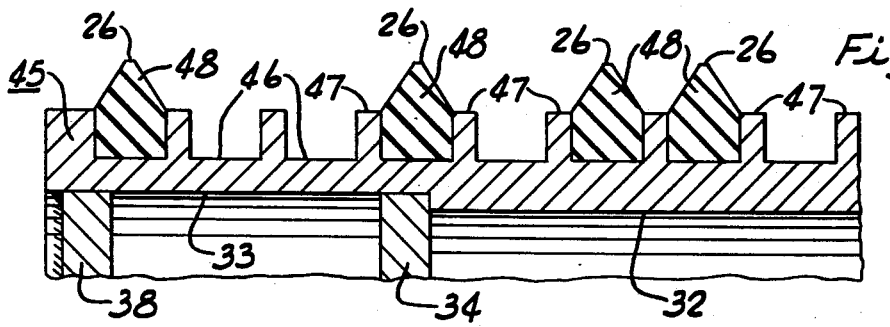
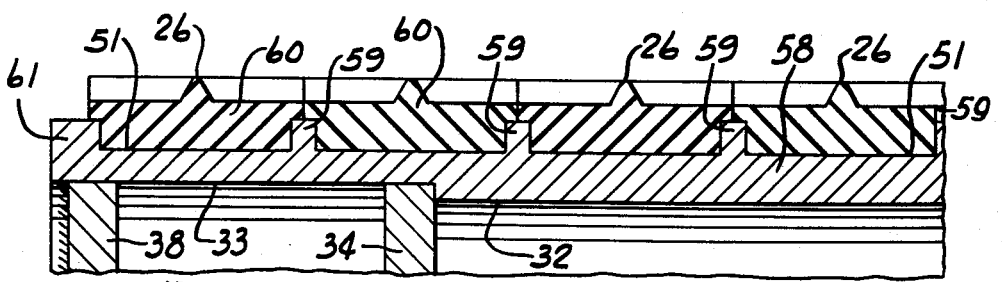
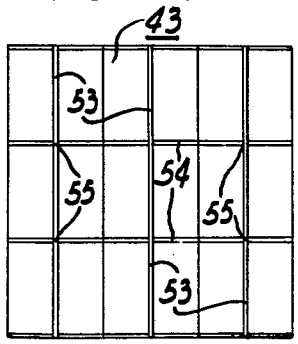
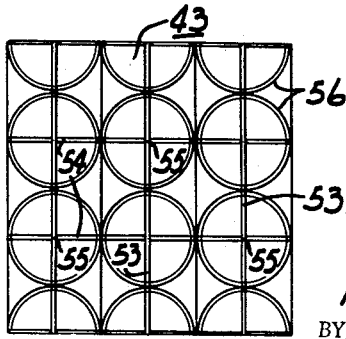
INVENTOR.
RALPH A. PANNIER
BY
HIS ATTORNEY Jan. 28, 1964 R. A. PANNIER 3,119,329
MARKING DEVICE FOR DIFFERENTIALLY COATED TIN PLATE
Filed Feb. 23, 1961 3 Sheets-Sheet 3
Fig. 7
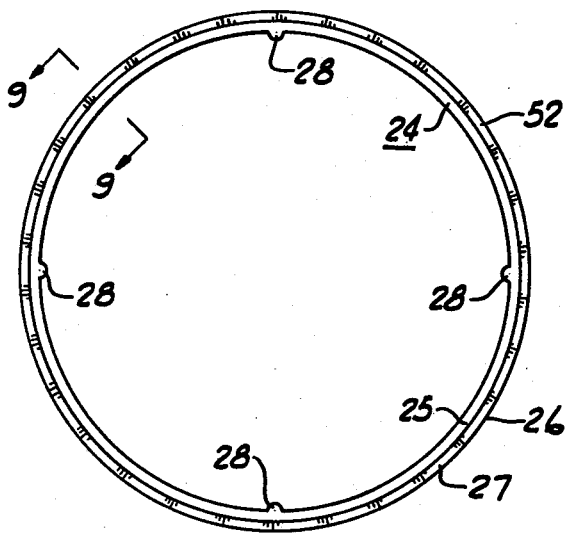
Fig. 8
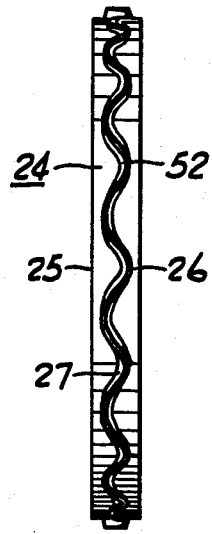
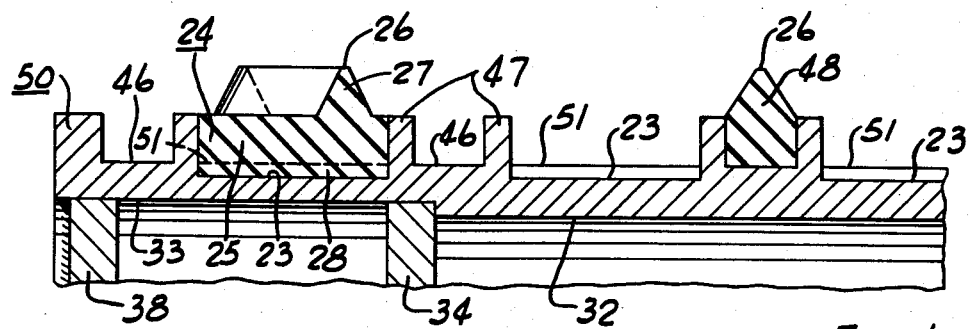
Fig. 6
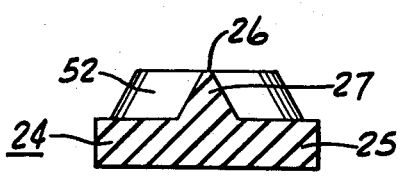
Fig. 9
INVENTOR.
RALPH A. PANNIER
BY
HIS ATTORNEY

United States Patent Office 3,119,329
Patented Jan. 28, 1964

3,119,329
MARKING DEVICE FOR DIFFERENTIALLY COATED TIN PLATE
Ralph A. Pannier, McCandless Township, Allegheny County, Pa., assignor to The Pannier Corporation, Pittsburgh, Pa., a corporation of Pennsylvania
Filed Feb. 23, 1961, Ser. No. 91,185
1 Claim. (Cl. 101—375)

This invention relates generally to the marking of differentially coated tin plate surfaces to distinguish the coating weights and more particularly to the marking apparatus employed for this purpose.

As disclosed in United States Patent 2,770,872 of November 20, 1956, the method of marking differentially coated tin plate surfaces is made by cutting a marking pattern in the face of a long cylindrical roll of solid reflexible rubber. This is an expensive die and when worn has to be recut. The die marking surfaces cut thereon wear merely because of the variation in pressure along the length of the long rubber cylinder which extends for the full width of the tin plate. Again differences in the rubber composition may account for the uneven wearing of the die along the cylindrical rubber drum. Any changes, corrections, or repairs to this rubber die are not only expensive but sometimes impossible and a new cylindrical die is required.

The principal object of this invention is the provision of an integrated die for marking differentially coated tin plate surfaces. This integrated die is made of die sections which are independently applied to the die carrying drum and which combine with each other to apply a marking code that tells the weight of the tin plate applied as well as the differential. This integrated marker may be used for both sides being provided with a different code for each and at the same time indicated the tin plate weight.

Another object is the provision of an integrated marker that is made of a series of independent bands that cooperate with each other to provide a complete code for marking tin plate to give the complete history of the iron, tin plate, and weights thereof for both sides of a differentially coated tin strip.

Another object is the provision of a marker made of a series of adjacent independent bands which mechanically cooperate with each other to complete a predetermined pattern in a design that has the appearance of a continuous design and signifies in code the history of the surface or thing which is marked.

Another object is the provision of a locking means in the form of a transverse bar on an annular die that interlocks in a corresponding transverse slot in a marking drum for carrying the annular die. The annular die is tighter than the drum and must be stretched to be positioned on the drum.

Another object is the provision of a die and carrying drum wherein the drum is provided with shoulder means to prevent an annular rubber die from moving longitudinally of the drum. This shoulder means operated in combination with a series of annular die members to hold them against axial movement of the die members on the drum, which shoulder means may be a shoulder adjacent each of the opposite ends of the drum or opposed shoulders for each annular die of the series. When only two opposed shoulders are employed the bodies of the successive annular die member lock them against shifting axially of the drum. If an annular groove is provided for each annular die member the die is preferably constructed with a shoulder or shoulders that extend over the lands between the grooves to support die character surfaces that combine with similar characters on the die in adjacent grooves to continue to complete the design or code to be printed.

Other objects and advantages of this invention appear hereinafter in the following description and claim.

The accompanying drawings show for the purpose of exemplification without limiting this invention or the claim thereto, certain practical embodiments illustrating the principles of this invention, wherein;

FIG. 1 is a diagrammatic representation of a tin plating mill having a marker applied thereto.

FIG. 2 is a view in elevation of one form of die supporting drum comprising this invention.

FIG. 3 is a sectional view taken along line 3—3 of FIG. 2.

FIG. 4 is a sectional view of the drum showing a modified form of die and die groove.

FIG. 5 is a sectional view of the drum showing a modified form of dies on a drum for marking continuous lines in code.

FIG. 6 is a further modification of the die and drum.

FIG. 7 is an end elevation of the die shown in FIG. 6.

FIG. 8 is a side elevation of the die shown in FIG. 6.

FIG. 9 is an enlarged sectional view taken on line 9—9 of FIG. 7.

FIG. 10 is an enlarged sectional view showing a modified form of die and drum.

FIG. 11 is an enlarged view of a printing formed by the die structure illustrated in FIG. 10.

FIG. 12 is an enlarged view of a printing from a die structure depicting combination squares and circles.

Referring to FIG. 1 of the drawings the electroplating line comprises the steel coil reel off 1 from which the steel being reeled therefrom at a high rate of speed is indicated by the strip 2 which first passes through the cleaning compartment 3 that cleans and washes both sides of the strip after which it is passed through a drying member 4. The strip then passes over the idler rollers 5 and 6 and back over the first electroplating mechanism 7 which coats one surface of the strip 2 after which the strip continues to pass over the rolls 8 and 9 and thence over the second electroplating mechanism 10. The electroplating apparatus such as illustrated at 7 and 10 form no part of this application but are merely shown here to indicate that both sides of the strip 2 are supplied with an electroplating which is preferably of the electrolytic process wherein current is employed and is passed through the fast traveling sheet strip 2 for the purpose of applying or depositing the tin thereon. If the coating mechanism 7 is for the purpose of coating the inner surface of the tin product such as a can this mechanism will apply a greater weight of tin per unit area than that of the mechanism 10 which is intended to coat the outside of the strip 2 with a lighter weight tin surface materially less in weight than that supplied for the inner surface of the can. Thus the opposite sides of the strip 2 are provided with the differentially coated tin plate surfaces and it is one of the principal objects of this invention to mark these surfaces so that there will be no question as to which surface should be formed into the inner surface of the can and which surface should be formed into the outer surface of the can.

After the strip passes from the electroplating mechanism 10 it is passed through the washer 11 and the dryer 12 as consecutive steps, then it is brought out to the first marking station 13 which marks the light or outer surface of the strip 2 and thence the strip passes through the marking mechanism indicated at the station 14 which marks the inner surface or heavier surface as applied by the coating mechanism 7. The printing of both sides of the tin plate is optional. However, it is usually done before the strip is passed through the flow brightening or reflowing apparatus 15 thence through the quench tank 16 after having passed over the roller 17 and is drawn upwardly over the roll 18 and thence to the units for subsequently treating the strips and to the usual coiler or to flying shears. The strip 2 travels at a very high rate of speed through this process and thus the two marking zones 13 and 14 must be capable of readily marking the surface under high speed conditions which marking must not destroy the luster of the tin and is preferably only visible by the use of reflected light. The present invention is concerned specifically with the character of the marking dies and drums employed in combination therewith for producing the marking on the tin plate.

As shown in FIG. 2 the drum 20 is mounted on the shaft member 21 and its smooth cylindrical surface 22 is provided with a series of longitudinal slots 23 which in this instance are placed every ninety degrees as illustrated in FIG. 3. The slots 23 stop short of the ends of the drum and function as shoulders. Such a drum is designed to receive the series of dies such as illustrated at 24 in FIGS. 6 to 9 wherein each die member 24 comprises the body portion 25 and a printing surface 26 supported by the frusto conical intermediate surface 27 which projects outwardly from the body surface 25 and functions as a gradually reducing support for the printing surface 26. As illustrated in FIGS. 6 and 7 these annular die members 24 are provided with a plurality of locking lugs 28 of which there are four in number shown and which are received in the transverse slots 23 shown in FIGS. 2 and 3. When a series of the annular die members 24 is placed on the drum 20 shown in FIGS. 2 and 3 enough of the die members or blanks and the widths of each body portion 25 make up a total dimension equivalent to the length of the base section 22 are employed to fill the whole axial surface of the cylinder 20 between the ends 30 and 31 of the transverse slots 23. Thus the ends of these slots 30 and 31 form abutments which prevents the die members from moving axially on the drum and a sufficient number of die members having the proper width are employed to completely cover this section of the drum surface. Since the die member is solid and is in continuous surface contact with the surface of the drum 20 it lends complete support of the annular die printing surface 26. The transverse lugs 28 also fit the transverse slots 23 to lend continuous support to the printing surface 26.

As shown in FIGS. 2 and 3 the drum has an inner bore of small diameter as indicated at 32. The next outer diameter is 33 being somewhat larger to form a shoulder for receiving the discs 34 at opposite ends of the bore 32 which discs are provided with a snug fit in the bore 33 and are welded to the inner end of the shaft 21. The shaft 21 is provided with a smaller diameter inner bore 35 which forms a shoulder and an enlarged diameter 36. The next section 37 is substantially the same diameter as the section 35 for the purpose of receiving the outer disc 38. The discs 34 and 38 are welded to the shaft and the discs 38 are in turn welded to the drum. This provides a relatively strong drum for supporting dies of this character and the drums may range from lengths of forty to fifty-two inches. The forty inch drum may be designed to receive seventy-eight or less marking devices, whereas the fifty-two inch drum may have as many as one hundred and two marking devices or less. These drums can be as large as ten inches in diameter and their shafts are likewise fairly large such as from two to three inches.

Referring specifically to FIG. 4 the drum 40 is provided with only two shoulders 41 and 42 adjacent opposite ends of the drum and these two shoulders form the locking surfaces for retaining a multiple series of dies such as illustrated at 43, the dies having rectangular base sections engaging each other's base section and being snugly received between the shoulders 41 and 42 to lock them in place. The single groove 44 annular of the drum may also be provided with four of the transverse slots 23 for interlocking the die members in the same manner as that illustrated in FIGS. 2 and 3.

In the drum 45 as shown in FIG. 5, a series of annular grooves 46 are provided. Each of these grooves is smaller than a half inch in width but are on half inch centers. The grooves being approximately three-eighths of an inch wide and the spacing or lands 47 therebetween being approximately one-eighth of an inch wide. Thus by providing a multiple series of slots 46 one may selectively place die members in predetermined slots to indicate a code or a reading of the material being marked such as the character of the steel, the weight of the electrolytic coating, the date or any other code arrangement that is desired. One may for instance, skip two of the slots such as indicated at 46 and then place a marker such as indicated at 48, then skip the next consecutive slot and thereafter occupy the next consecutive two grooves which arrangement of the dies in marking the tin plate would have a definite code meaning. Thus when one is provided with seventy-eight or one hundred and two annular grooves one may readily see that certain combinations of the grooves with predetermined spacing therebetween provide a code arrangement to clearly mark detailed information in regard to the tin plate or other object being marked. As shown in FIG. 5 the dies 48 merely have a printing surface 26 which is annular and which prints a uniform straight line. Thus in a structure of this kind there is no necessity of providing transverse locking slots 23.

In the drum 50 shown in FIG. 6 a combination of small slots 46 and large slots 51 are provided in series so that a combination of dies may be employed which dies have a width equal to the dies 43 or the dies 24 as shown in FIGS. 4 and 6 respectively. The dies such as illustrated at 24 which are wide and must be locked by the transverse lugs 28 in the transverse slots 23 may thus be provided in the grooves 51, whereas the grooves 46 do not need such a locking mechanism as long as their printing surface 26 is a continuous annular circle for the purpose of forming a straight line. Here again as illustrated the combination of the different groove widths may be employed in determining the structure of the dies for producing different codes to be depicted in printing on the article or tin plate.

As shown in FIGS. 6 to 9 the die member 24 provides a sine wave 52, the printing surface 26 of which follows the sine curve and is continuous. This printing may be formed on a narrower die member such as illustrated at 48 in which case it would be necessary to provide an interlocking slot 23 and a lug 28.

Referring to FIGS. 4 the die members 43 are substantially rectangular in cross section for the full width and the frusto conical portion 27 supporting the annular circular printing surface 26 is located in the middle of the body of the die 43 and at repeated intervals a transverse frusto conical surface 49 is provided for supporting the transverse printing line 29 which combination produces the squares as depicted in FIG. 11 by the annular printing lines 53 and the transverse printing lines 54. It will be noted that the annular printing lines 53 are in the centers of the die members 43 and the transverse lines 54 are made by the transverse sections 29 which meet with those of adjacent die members 43 so as to produce a straight transverse line the intersection being indicated at 55 which represents a point on one side of a square representing the printed figure.

As shown in FIG. 12 the circle 56 and their cross diameter markings are reproductions of printed figures formed by adding such printing characters to the die members 43 of FIG. 11. A circular configuration can be formed in a similar manner to the sine wave die of FIG. 8. The center of the circle here being shown intermediate of the points 55. Obviously the circle design in one die member or cooperative in adjacent die members or other modifications of similar designs could be employed without the use of horizontal, vertical or diagonal lines.

Each of these annular rubber die members must be stretched like a rubber band to get them on the drum.

Their inner diameter is smaller than that portion of the drum surface on which they are normally seated which is on the face of the drum as shown in FIGS. 2 and 3 and in the grooves in the other views.

Referring to FIG. 10 the drum member 58 is provided with the wide slots 51 separated by the lands 59 for receiving the die members 60. These die members are very similar to the die members 43 but they have a section of the rubber die resting on top of the intermediate lands 59 and the end lands 61. Thus a portion of the body of the die member 60 rests on top of the lands to support the printing face 26. With this structure the whole of the die will cover the drum including the land sections 59 and 61.

I claim:

A device for continuously marking the surface of continuously moving strip material which consists of a drum to be mounted for rotation adjacent the continuously moving strip material and having annular seating surface means transversely across said drum, a transverse slot means in said seating surface means, a plurality of flexible and expansible continuously annular independent elastomer printing bands each of uniform width materially narrower than the transverse extent of said seating surface means, each independent elastomer printing band having an internal diameter smaller than the diameter of said seating surface means and expansible to be stretched and placed thereon to grip said seating surface means, each independent elastomer printing band having a body section with an outwardly extending section terminating in a printing surface that cooperates with the printing surfaces of adjacent independent elastomer printing bands, an inwardly projecting transverse locking lug means on the inner surface of each independent elastomer printing band to intermesh in said transverse slot means to lock said independent elastomer printing bands and laterally align their printing surfaces in cooperative relation, said annular independent elastomer printing bands completely covering said annular seating surface means, the adjacent cooperative printing surfaces of adjacent independent elastomer printing bands forming an uninterrupted continuous printing design laterally and annularly to print an uninterrupted longitudinal and lateral printing design for the full width of the printing surfaces on the continuously moving strip.

References Cited in the file of this patent

UNITED STATES PATENTS

| | | |
|---|---|---|
| 1,820,338 | Youngchild et al. | Aug. 25, 1931 |
| 1,863,816 | Webern et al. | June 21, 1932 |
| 2,172,144 | Oakes | Sept. 5, 1939 |
| 2,211,794 | Rohland | Aug. 20, 1940 |
| 2,222,333 | Wenzel et al. | Nov. 19, 1940 |
| 2,315,729 | Nunnally | Apr. 6, 1943 |
| 2,746,389 | Alessi et al. | May 22, 1956 |
| 2,871,783 | Schmutz | Feb. 3, 1959 |

FOREIGN PATENTS

| | | |
|---|---|---|
| 514,632 | Great Britain | Nov. 14, 1939 |